US005754318A

United States Patent [19]

Agopian

[11] Patent Number: 5,754,318
[45] Date of Patent: May 19, 1998

[54] APPARATUS FOR PARALLEL RECORDING OF HOLOGRAMS IN A DYNAMIC VOLUME MEDIUM

[75] Inventor: Greg Agopian, Oxnard, Calif.

[73] Assignee: The United States of America as represented by the Secretary of the Navy, Washington, D.C.

[21] Appl. No.: 891,987

[22] Filed: Jul. 14, 1997

[51] Int. Cl.[6] .................................................. G03H 1/10
[52] U.S. Cl. ............................... 359/10; 359/7; 359/22; 365/125
[58] Field of Search ........................ 359/3, 7, 10, 22, 359/28; 365/125, 216; 369/103

[56] References Cited

U.S. PATENT DOCUMENTS

| 5,121,231 | 6/1992 | Jenkins et al. | 359/10 |
| 5,440,669 | 8/1995 | Rakuljic et al. | 359/22 |
| 5,493,628 | 2/1996 | Lawandy | 359/7 |

OTHER PUBLICATIONS

Adaptive Optical Networks Using Photorefractive Crystals. Psaltis et al. Applied Optics, vol. 27, No. 9 Apr. 1, 1988.
Elements of a Unique Bacteriorhopsin Neural Network Architecture. Lewis et al. Applied Optics, vol. 30, No. 5 Feb. 10, 1991.

*Primary Examiner*—Paul M. Dzierzynski
*Assistant Examiner*—Darren E. Schuberg
*Attorney, Agent, or Firm*—Melvin J. Sliwka; David S. Kalmbaugh

[57] ABSTRACT

Apparatus for the simultaneous parallel recording of holograms on a dynamic volume medium. Directed along a recording axis is a polychromatic source image which has multiple component images to be recorded in the dynamic volume medium. Each component image of the polychromatic source image has a separate frequency. Directed along a reference axis is a polychromatic reference beam having a plurality of monochromatic reference components with each reference component having a separate wavelength. Positioned upstream from the volume on the reference axis is a prism which angularly multiplexes the reference components to provide a plurality of monochromatic reference beams which are directed at angular offsets from the reference axis to the medium. Each of the reference beams has a wavelength which is identical to the wavelength of only one of the monochromatic component images of the polychromatic source image. Each of the reference beams arrives at the dynamic volume medium at a different angle of incidence from an adjacent monochromatic reference beam because of the dispersion of the monochromatic reference components by the prism. This dispersion of the reference beam provides for the simultaneous parallel recording of holograms at a plurality of locations within the medium.

12 Claims, 1 Drawing Sheet

APPARATUS FOR PARALLEL RECORDING OF HOLOGRAMS IN A DYNAMIC VOLUME MEDIUM

BACKGROUND OF THE INVENTION

1. Field of the Invention

The present invention relates generally to apparatus for recording holograms for dynamic information storage. More particularly, the present invention relates to a method and apparatus that allows for the parallel recording of holograms in a volume for use in the optical implementation of neural networks.

2. Description of the Prior Art

There is currently a need for dynamic volume holograms which will allow for expanding the use of holographic optical neural networks that have the capability of learning in real-time rather than having to re-fabricate a new hologram after training the neural network or whenever dynamic system changes occur that require new interconnection weights. The adaptive property of being able to train a neural network requires an ability to dynamically reconfigure the interconnection weights between input arrays and output arrays of the network.

A neural network consist of processing elements referred to as neurons. Each neuron of the network has its input signals individually weighted and then summed to provide an output. The neuron's output is governed by a nonlinear function of the summed weighted inputs. The following equation represents the $i^{th}$ neuron's output $Y_i$.

$$Y_i = f(\Sigma W_{ij} X_j) \tag{1}$$

where $W_{ij}$ represents the weight between the $j^{th}$ input, $X_j$ and the $i^{th}$ neuron of the layer. Thresholding takes place via the function $f(\Sigma W_{ij} X_j)$.

A neural network generally consist of multiple layers that are cascaded. In a simple neural network system with feed forward connections, the output from one layer, $Y_i$ becomes one of the preweighted inputs, $Y_k$ for the next layer.

Neural network systems which are implemented optically are on-line systems because the weight adaptation takes place in the hologram. Off-line systems are neural network systems in which the training values are computed in a digital computer. Off-line systems require reconfigurability when the trained weights are to be written in the hologram in realtime. The training plane of off-line systems acts as a reference beam in order to record the interference pattern between the training plane and the input plane.

Photorefractive crystals which are the most common type of dynamic volume holograms allow for the optical implementation of neural networks. For a photorefractive crystal the perturbations in the photorefractive index of the crystal record the weights $W_{ij}$ of equation one. The summation of equation one takes place optically. The desired nonlinear function $f(\Sigma W_{ij} X_j)$ is implemented in the output plane via a spatial light modulator. After the neural network is trained, there is no longer a requirement for a training plane. If multiple neural network layers are to be implemented then this is accomplished by cascading the system with the output of one array acting as the input to the next array.

If, however, the number of neurons in each layer is relatively small then one photorefractive crystal may be used to record multiple layers of the neural network. This requires the use of mirrors to provide optical feedback between the output array and the input array. It should be noted that off-line training may be more suitable in a practical situation unless the dynamics of the system are changing rapidly.

Although using volume holography gains an extra degree of freedom, there are still problems in achieving full interconnectability between an N×N input array and an N×N output array. Based on physical and geometrical limitations, the number of resolution cells available for weight storage is limited to $N^3$. This results in several possibilities of sampled interconnections, i.e. N to $N^2$ or $N^2$ to N for situations that require fan-out (multiple outputs) or fan-in (multiple inputs), respectively. Generally, however, there is a need to have about as many input neurons as output neurons, especially if there is cascading of layers.

The sampling arrangement used is one that is set up to have the input and output arrays be represented by 1.5 dimensional fractal sampling grids. This has another advantage for neural networks in that it reduces crosstalk, which is the reading out of unwanted or erroneous recordings caused by Bragg degeneracy. By using a sampling grid, the extraneous crosstalk readouts can be directed to unsampled locations in the output array.

Presently, multiple holograms are recorded within a storage medium or dynamic volume medium, such as a photorefractive crystal, by angular multiplexing of the multiple holograms. Angular multiplexing records the holograms at different angles within the storage medium. This is generally accomplished by rotating the photorefractive crystal about an axis perpendicular to the recording optical axis and the reference optical axis. In other optical recording systems mirrors are used to rotate the recording wave axis or the reference wave axis while the recording crystal remains stationary.

These prior art systems record the holograms in a serial fashion which results in certain disadvantages to the accurate and efficient recording of the holograms within the storage medium. First, if it takes a time t to record one exposure, then it will take at least a time N*t to record N exposures with N representing the multiple holograms to be recorded. Second, each time an exposure is written, the previously recorded holograms are partially erased. The rate of erasure for previously recorded holograms increases significantly for each subsequent recording of a hologram on a storage medium.

SUMMARY OF THE INVENTION

The present invention overcomes some of the disadvantages of the prior art including those mentioned above in that it comprises a relatively simple yet highly efficient apparatus for the simultaneous parallel recording of holograms in a dynamic volume medium. The apparatus of the present invention includes a polychromatic source image having multiple component images of an image array to be recorded in the dynamic volume medium. The polychromatic source image is directed toward the dynamic volume medium along an optical recording axis. Each component image of the polychromatic source image has a separate wavelength.

There is also directed along an optical reference axis toward the dynamic volume medium a polychromatic reference beam having a plurality of monochromatic reference components with each monochromatic reference component having a separate wavelength.

Positioned upstream from the dynamic volume medium on the reference axis is a prism which angularly multiplexes the monochromatic reference components of the reference beam to provide a plurality of monochromatic reference beams which are directed at slight angular offsets (less than one degree) from the reference axis toward the dynamic volume medium. Each of the monochromatic reference beams has a wavelength which is identical to the wavelength of only one of the monochromatic component images of the polychromatic source image.

Each of the monochromatic reference beams arrives at the dynamic volume medium at a different angle of incidence from an adjacent monochromatic reference beam because of the dispersion of the monochromatic reference components of the reference beam by the prism. This dispersion of the reference beam provides for the simultaneous parallel recording of holograms in the dynamic volume medium at a plurality of locations within the medium.

DETAILED DESCRIPTION OF THE PREFERRED EMBODIMENT

Figure 1:
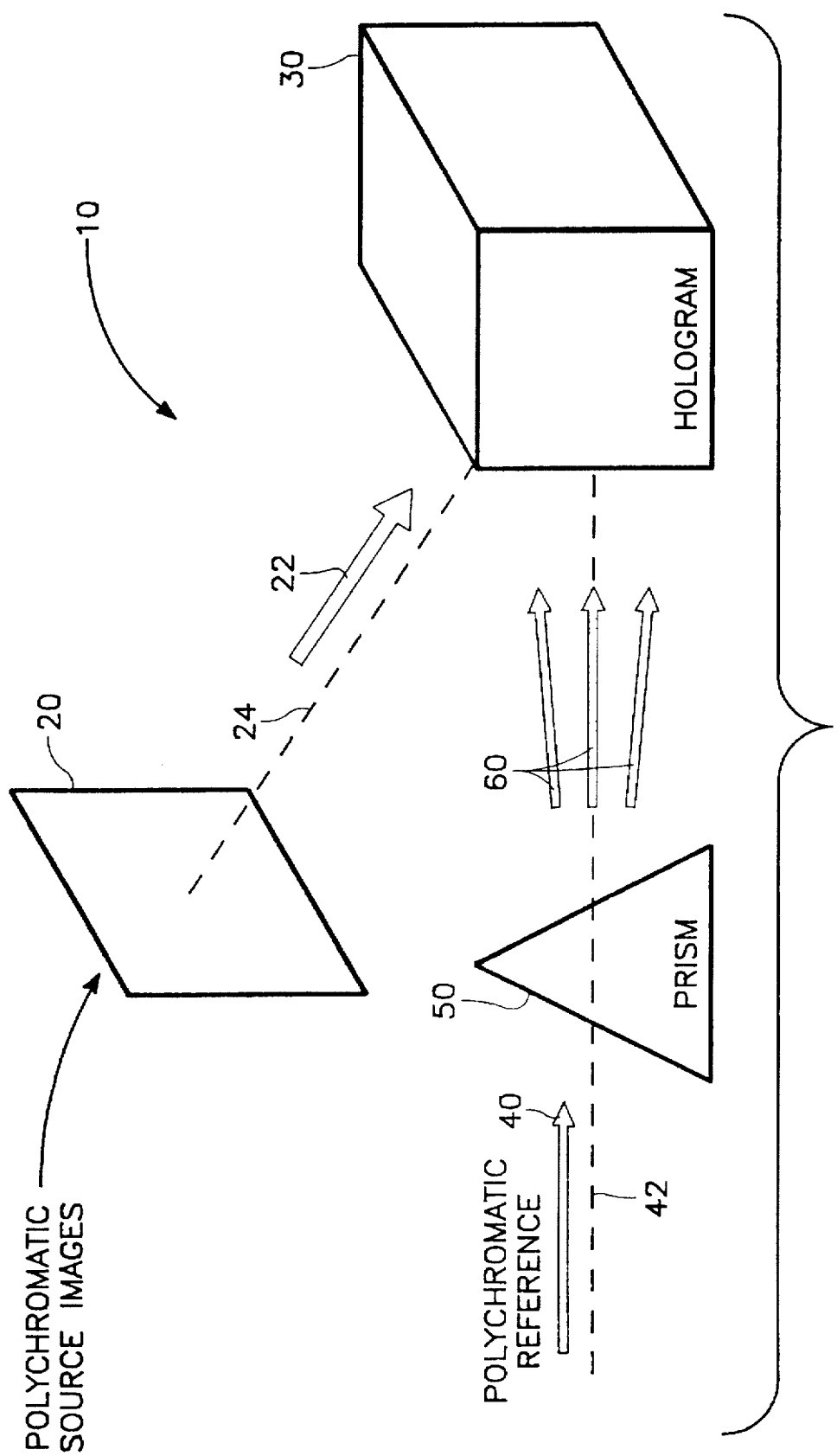
FIG. 1 is a schematic diagram of an apparatus for parallel recording of holograms in a dynamic volume medium which constitutes a preferred embodiment of the present invention.

Referring to FIG. 1, there is shown an apparatus 10 which provides for parallel recording of multiple holograms in a dynamic volume medium/volume hologram 30. There are positioned upstream from dynamic volume medium 30 on an optical recording axis 24 a plurality of polychromatic source images 20. The multiple monochromatic component images of an image array to be recorded in dynamic volume medium 30 are stored in one polychromatic source image 22 of polychromatic source images 20. Polychromatic source image 22 is represented in FIG. 1 as a beam of light energy.

Each polychromatic source image 22 includes the monochromatic component images with each monochromatic component image of polychromatic source image 22 having a separate wavelength. This results in each monochromatic component image of the polychromatic source image 22 having a distinct frequency. Each polychromatic source image 22 is directed along optical recording axis 24 to dynamic volume medium 30 for parallel recording on dynamic volume medium 30.

Directed along an optical reference axis 42 toward dynamic volume medium 30 is a polychromatic reference beam 40 of light energy. Polychromatic reference beam 40 has a plurality of monochromatic reference components with each monochromatic reference component having a separate wavelength.

Positioned upstream from volume 30 on reference axis 42 is a prism 50 which operates as a controllable spectrally dependent dispersion device. As depicted in FIG. 1, polychromatic reference beam 40 is incident on prism 50 passing through prism 50. Prism 50 angularly multiplexes the monochromatic reference components of reference beam 40 to form or provide a plurality of monochromatic reference beams 60 which are directed at slight angle offsets (less than one degree) to the reference axis 42 toward dynamic volume medium 30. Each of the monochromatic reference beams 60 has a wavelength which is identical to the wavelength of only one of the monochromatic component images of source image 22.

Each of the monochromatic reference beams 60 arrives at dynamic volume medium 30 at a different angle of incidence from an adjacent monochromatic reference beam 60 because of the dispersion of the monochromatic reference components of reference beam 40 by prism 50. This dispersion of reference beam 40 in the manner depicted in FIG. 1 provides for the simultaneous parallel recording of holograms in dynamic volume medium 30 at a plurality of locations within medium 30.

The dynamic volume medium 30 of apparatus 10 may be comprised of (1) a photorefractive crystal or (2) a photoanistropic dynamic organic dye. Either material may be used for trainable neural networks. Photorefractive crystals, which are reconfigurable, are highly sensitive nonlinear optical materials that exhibit a photorefractive effect. The photorefractive effect is an optically induced change in the refractive index of the material about its background value. Although most materials exhibit this effect, materials that are used for implementing neural networks must exhibit a well defined photorefractive effect.

Examples of materials that exhibit this photorefractive effect are $LiNbO_3$ (lithium niobate) and $BaTiO_3$ (barium titanate). The refractive index of $LiNbO_3$ is about 2.27 at a wavelength of 514.5 nm. An advantage of photorefractive crystals is their extensive use makes the crystals commercially available in sizes up to 1 cm×1 cm×1 cm.

Photorefractive crystals also exhibit highly desirable diffraction efficiencies as well as desirable fan-out (disperse outgoing beams) and fan-in (collect incoming beams) capabilities.

Photoanisotropic dynamic organic dyes may also be used as reconfigurable neural networks. Photoanisotropic dynamic organic dyes are made by suspending in a polymer host, such as polyvinyl alcohol, organic molecules which are responsive to photon excitation, such as bacteriorhodopsin (bR) or Methyl Orange. Photoanisotropic dynamic organic dyes have the distinct advantage of being able to better approximate biological neural networks. In addition, photoanisotropic dynamic organic dyes exhibit high signal-to-noise ratio which results in reduced cross talk and increased weight storage capacity. For volumes greater than 1000 $cm^3$ fabrication of photoanisotropic dynamic organic dyes is relatively easy when compared to photorefractive crystals.

It is desirable that the frequency selective dispersing device of apparatus 10 meet certain design criteria to achieve maximum diffraction efficiency and make use of the angular selectivity of dynamic volume holograms. This, in turn, requires that the angular dispersion of the frequency selective dispersing device match the Bragg condition for the holograms recorded in dynamic volume medium 30. The Bragg condition must be satisfied simultaneously for different frequencies at different incidence angles. The input to dynamic volume medium 30 is given by the following equation:

$$2\Lambda \sin \theta' = 80 \quad (2)$$

where $\Lambda$ is the grating spacing within medium 30.

A diffraction grating, which could operate as a frequency dispersing device for apparatus, outputs light at an angle based on the following equation:

$$n\lambda = d \sin \theta' \quad (3)$$

where:
n is the diffraction order
$\lambda$ is the wavelength of the light
d is the distance between diffraction grating slits
$\theta'$ is the angle of the resulting diffracted beams.

By setting n equal to one the diffraction grating can be matched to volume hologram 30 when:

$$d = 2\Lambda \quad (4)$$

Prism 50, which is the frequency selective dispersing device used in the preferred embodiment of apparatus 10, may be fabricated from glass or other materials in which the index of refraction varies with the wavelength of electromagnetic wave or light energy which is incident on the glass. The index of refraction relative to air for a variety of glass materials is given by the following table.

TABLE I

| Material | Wave Length in Microns | | | | | | | |
|---|---|---|---|---|---|---|---|---|
| | .361 | .434 | .486 | .589 | .656 | .768 | 1.20 | 2.00 |
| Zinc crown | 1.539 | 1.528 | 1.523 | 1.517 | 1.514 | 1.511 | 1.505 | 1.497 |
| Higher dispersion crown | 1.546 | 1.533 | 1.527 | 1.520 | 1.517 | 1.514 | 1.507 | 1.497 |
| Light flint | 1.614 | 1.594 | 1.583 | 1.575 | 1.571 | 1.567 | 1.559 | 1.549 |
| Heavy flint | 1.705 | 1.675 | 1.664 | 1.650 | 1.644 | 1.638 | 1.628 | 1.617 |
| Heaviest flint | | 1.945 | 1.919 | 1.890 | 1.879 | 1.867 | 1.848 | 1.832 |

Snell's law provides the following equation for the frequency dependent output angle $\theta_t$ of light transmitted through prism 50

$$\sin\theta_t = n \sin\left( \arcsin\left[ \frac{\sin\alpha}{n} \right] - 2\alpha \right) \quad (5)$$

where:
n is the index of refraction of prism 50.
$\alpha$ is one half the prism apex angle.

It should be noted the equation assumes incident light is perpendicular to the axis of symmetry of prism 50, that is the incident light rays upon prism 50 are at the angle $\alpha$ with respect to the normal vector of the surface of the prism. The frequency dependency of the output angle $\theta_t$ is dependent upon the index of refraction n of prism 50. This dependence is given in Table I for various glass materials which may be used to fabricate prism 50.

From Table I it may be seen that the index of refraction n does not change significantly with respect to wavelength and thus frequency over the wavelengths of Table I. For zinc crown, the change in the index of refraction is 0.043, while high flint exhibits a change of 0.088 in the index of refraction. Silicate flint glass exhibits a change in the index of refraction of about 0.07 across the visible portion of the electromagnetic spectrum.

Since the index of refraction of a particular prism 50 may not provide the desired angular spread for reference beam 40 for storing a significant number of holograms in storage volume medium 30, it may be desirable to use multiple prisms to disperse reference beam 40 in the manner required to satisfy the Bragg condition. For example, if there is a requirement to store 500 holograms in a one cm³ medium 30, multiple prisms may be positioned along reference axis 42 to achieve the desired angular spread for reference beam 40.

Since the orientation of prism 50 is a matter of choice, only the derivative of sin $\theta$t needs to match the derivative of sin $\theta$' with respect to $\lambda$ as shown by the following expression:

$$\frac{d(\sin\theta')}{d\lambda} = \frac{1}{2\Lambda} \quad (6)$$

This expression shows that as the grating spacing decreases which results in the number of weights that can be recorded increasing, the required dispersion in sin $\theta$' increases. This suggests the possibility of using more than one prism to allow for efficient and effective parallel recording of holograms in a dynamic volume medium 30.

Polychromatic source images 20 and polychromatic reference beam 40 may be provided by liquid crystal displays which generate and project light at multiple frequencies and would allow for at least three recorded holograms at the same time. Alternatively, tunable laser diode arrays may be used to provide polychromatic source images 20 and polychromatic reference beam 40. The tunable diode arrays would include multiple laser per pixel with each laser in the pixel representing a different frequency of the polychromatic light.

While the preferred embodiment of the present invention is useful for neural networks, it should be understood that the apparatus of the present invention has application in systems which require the significant storage capacity available in volume holographic materials such as optical memory systems and parallel computing systems.

From the foregoing, it may readily be seen that the present invention comprises a new, unique and exceedingly useful apparatus for the parallel recording of holograms in a volume hologram which constitutes a considerable improvement over the known prior art. Obviously many modifications and variations of the present invention are possible in light of the above teachings. It is therefore to be understood that within the scope of the appended claims that the invention may be practiced otherwise than as specifically described.

What is claimed is:

1. A method for simultaneously storing a plurality of holograms at different locations in a photorefractive crystal comprising the steps of:

directing a polychromatic source image along an optical recording axis toward said photorefractive crystal, said polychromatic source image having a plurality of monochromatic component images, each of said plurality of monochromatic component images having a wavelength;

directing a polychromatic reference beam along an optical reference axis toward said photorefractive crystal, said polychromatic reference beam having a plurality of monochromatic reference components, each said plurality of monochromatic reference components having a wavelength;

angularly multiplexing the monochromatic reference components of said polychromatic reference beam to form a plurality of monochromatic reference beams, wherein a prism is used to angular multiplex the monochromatic reference components of said polychromatic reference beam to form said plurality of monochromatic reference beams;

directing said monochromatic reference components along said optical reference axis toward said photorefractive crystal;

matching the wavelength of each of said monochromatic source images with the wavelength of only one of said monochromatic component images when said monochromatic reference beams and said polychromatic source image are incident on said photorefractive crystal to provide for a parallel recording of said plurality of holograms at said different locations in said photorefractive crystal.

2. The method of claim 1 wherein said plurality of holograms comprises at least three holograms.

3. An apparatus for simultaneously storing a plurality of holograms comprising:

a photorefractive crystal positioned on an optical recording axis;

means for directing a polychromatic source image along said optical recording axis to said photorefractive crystal, said polychromatic source image having a plurality of monochromatic component images, each of said plurality of monochromatic component images having a wavelength;

a prism spatially disposed upstream from said photorefractive crystal on an optical reference axis;

means for directing a polychromatic reference beam along said optical reference axis to said prism, said polychromatic reference beam having a plurality of monochromatic reference components, each said plurality of monochromatic reference components having a wavelength;

said prism angularly multiplexing the monochromatic reference components of said polychromatic reference beam to form a plurality of monochromatic reference beams;

said prism directing said monochromatic reference beams along said optical reference axis to said photorefractive crystal;

said photorefractive crystal simultaneously receiving said monochromatic reference beams and said polychromatic source image, said photorefractive crystal matching the wavelength of each of said monochromatic source images with the wavelength of only one of said monochromatic component images when said monochromatic reference beams and said polychromatic source image are incident on said photorefractive crystal to provide for a parallel recording of said plurality of holograms, each of said plurality of holograms being stored at a separate location in said photorefractive crystal.

4. The apparatus of claim 3 wherein said photorefractive crystal is fabricated from lithium niobate.

5. The apparatus of claim 3 wherein said photorefractive crystal is fabricated from barium titanate.

6. The apparatus of claim 3 wherein said prism is fabricated from glass.

7. The apparatus of claim 3 wherein said photorefractive crystal is an approximately 1 cm×1 cm×1 cm photrefractive crystal.

8. The apparatus of claim 3 wherein said means for directing said polychromatic source image along said optical recording axis comprises a tuned laser diode array.

9. The apparatus of claim 3 wherein said means for directing said polychromatic reference beam along said optical reference axis comprises a tuned laser diode array.

10. The apparatus of claim 3 wherein each of said plurality of monochromatic reference beams is angularly offset from said optical reference axis at an angle of less than one degree.

11. A method for simultaneously storing a plurality of holograms at different locations in a photorefractive crystal comprising the steps of:

directing a polychromatic source image along an optical recording axis toward said photorefractive crystal, said polychromatic source image having a plurality of monochromatic component images, each of said plurality of monochromatic component images having a wavelength;

directing a polychromatic reference beam along an optical reference axis toward said photorefractive crystal, said polychromatic reference beam having a plurality of monochromatic reference components, each said plurality of monochromatic reference components having a wavelength;

angularly multiplexing the monochromatic reference components of said polychromatic reference beam to form a plurality of monochromatic reference beams, wherein each of said plurality of monochromatic reference beams is angularly offset from said optical reference axis at an angle of less than one degree;

directing said monochromatic reference components along said optical reference axis toward said photorefractive crystal;

matching the wavelength of each of said monochromatic source images with the wavelength of only one of said monochromatic component images when said monochromatic reference beams and said polychromatic source image are incident on said photorefractive crystal to provide for a parallel recording of said plurality of holograms at said different locations in said photorefractive crystal.

12. The method of claim 11 wherein said plurality of holograms comprises at least three holograms.

* * * * *